Figure 6:
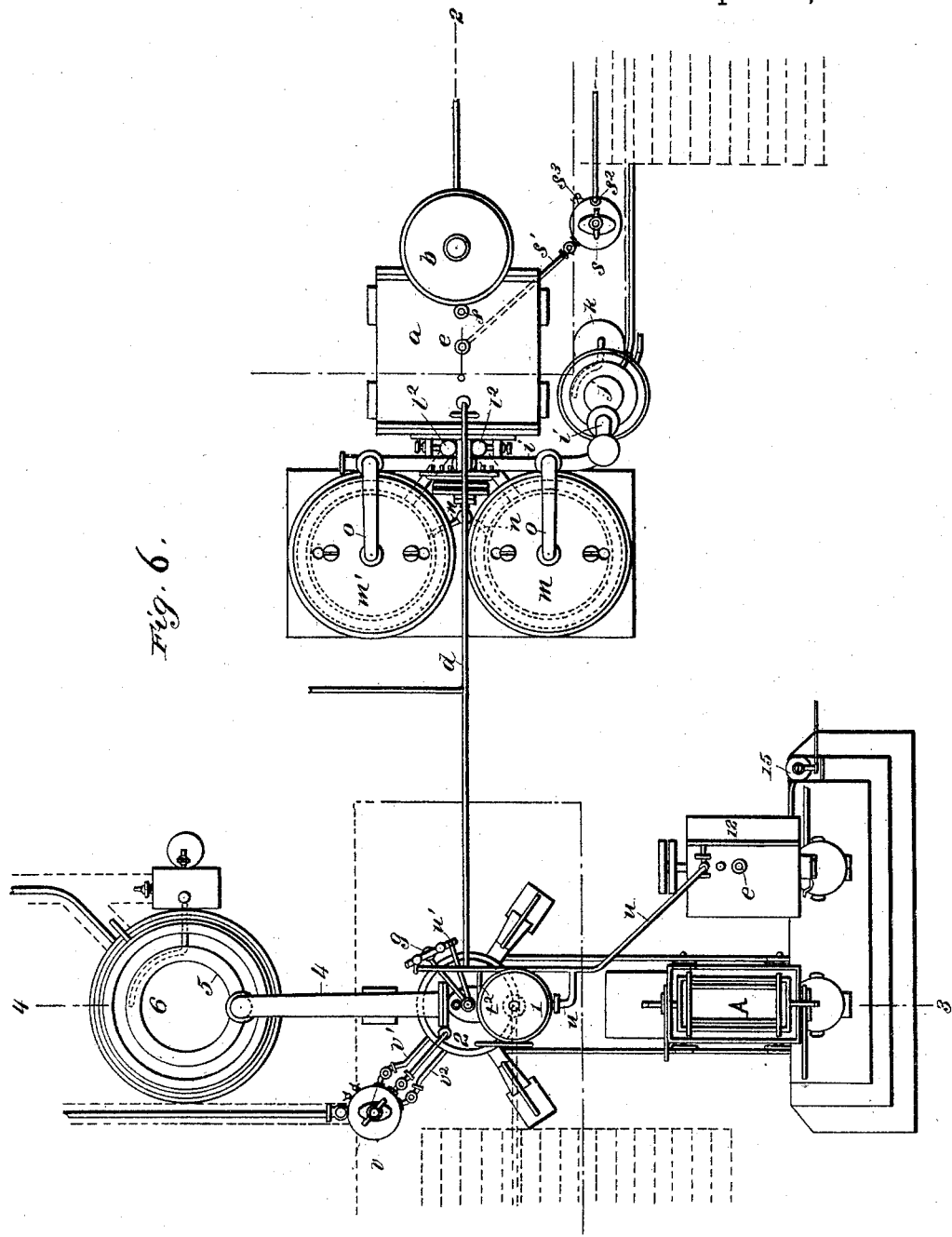

(No Model.) 4 Sheets—Sheet 1.
G. COL.
PROCESS OF TREATING CRUDE RESINS AND THEIR RESIDUES.
No. 495,543. Patented Apr. 18, 1893.
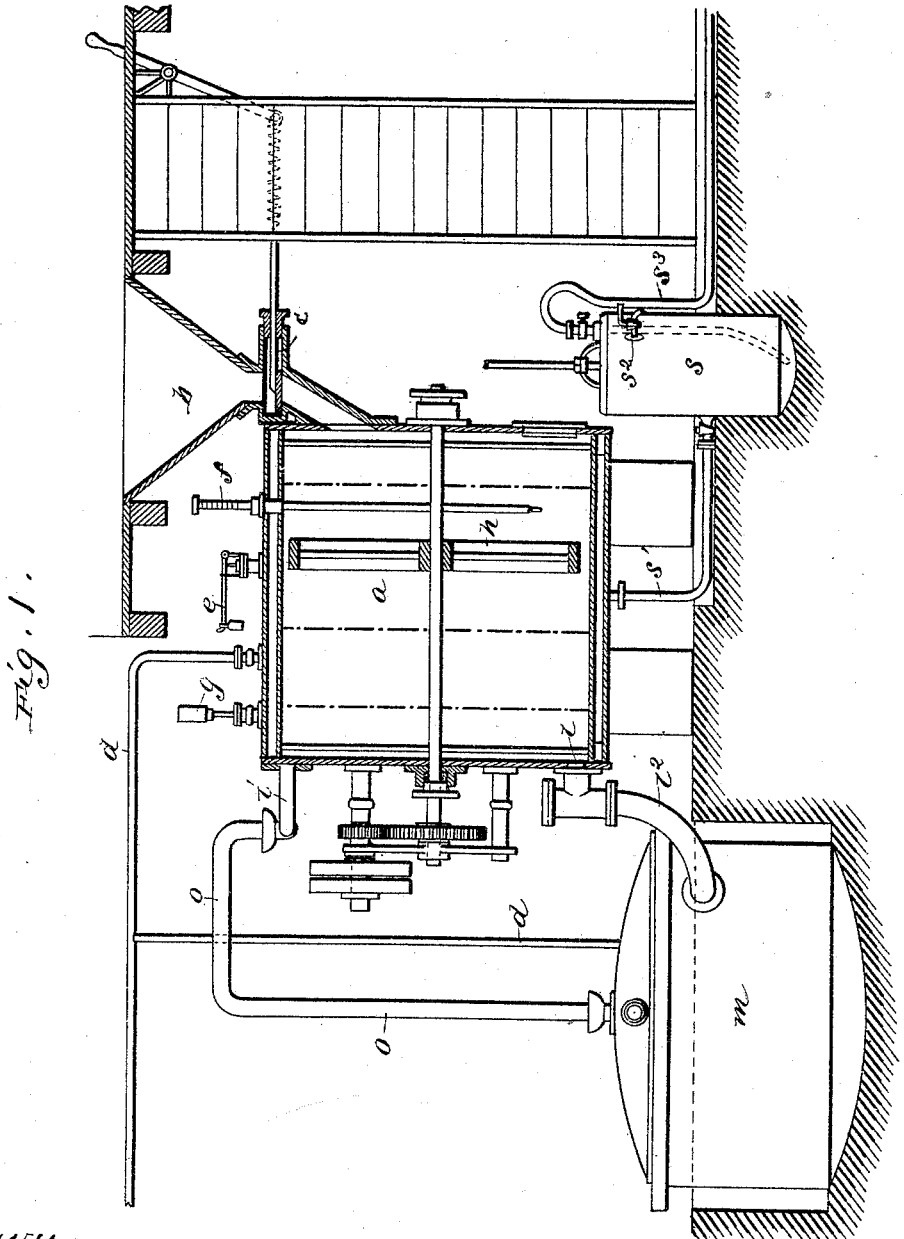
Witnesses:
Harry M. Zenk
Chas. E. Smith
Inventor:
Gabriel Col
by Briesen & Knauth
his Attorneys.

(No Model.) 4 Sheets—Sheet 2.
G. COL.
PROCESS OF TREATING CRUDE RESINS AND THEIR RESIDUES.
No. 495,543. Patented Apr. 18, 1893.
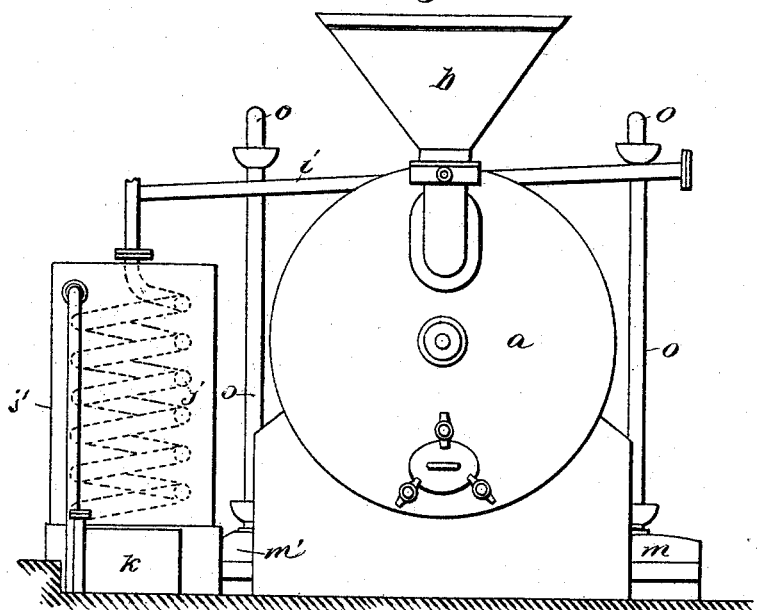
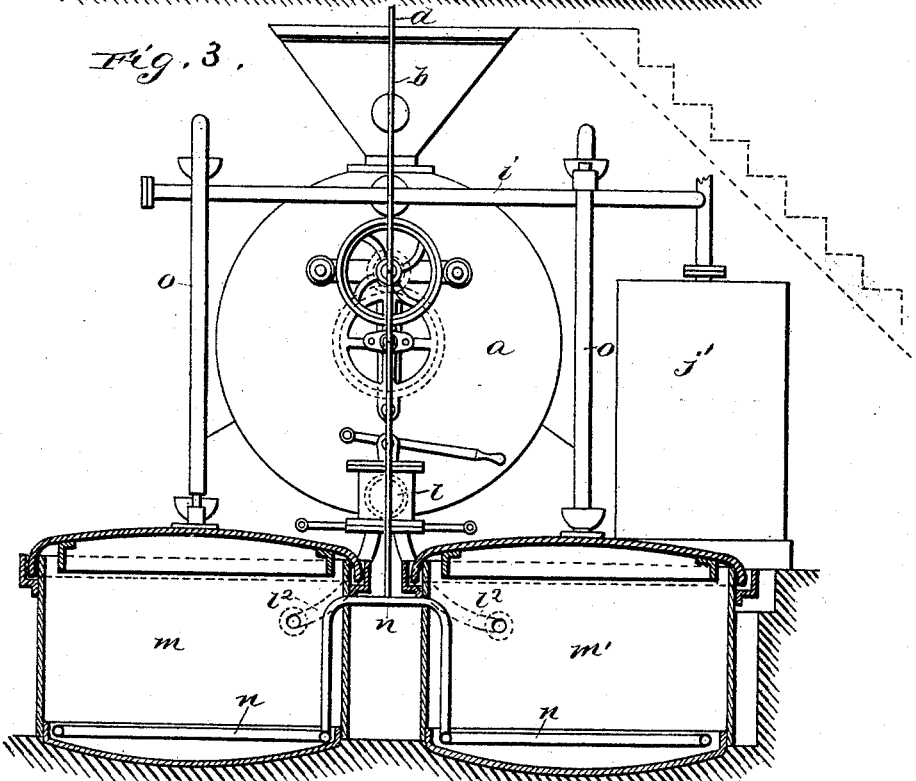

(No Model.) 4 Sheets—Sheet 3.
G. COL.
PROCESS OF TREATING CRUDE RESINS AND THEIR RESIDUES.
No. 495,543. Patented Apr. 18, 1893.
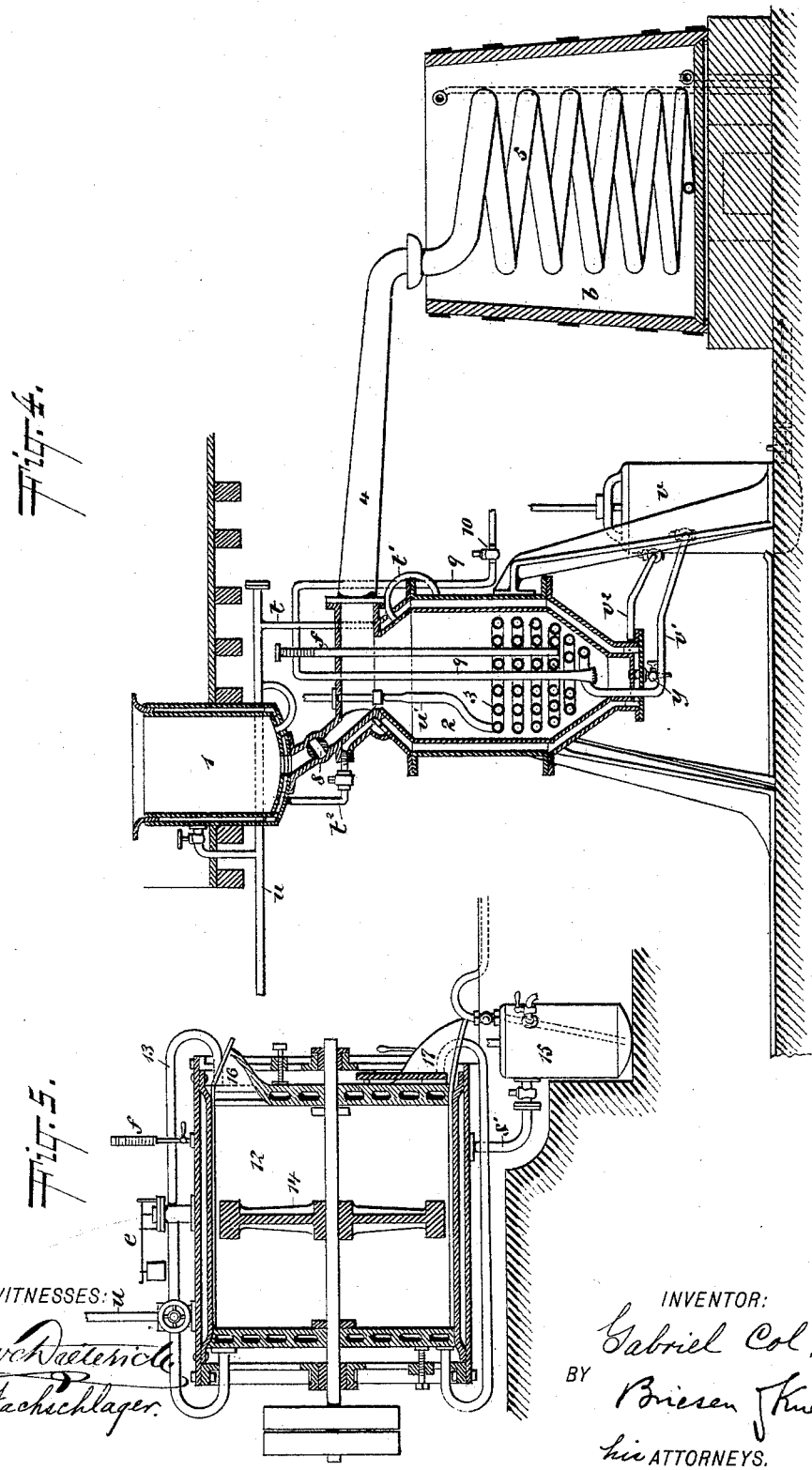

(No Model.) 4 Sheets—Sheet 4.

G. COL.
PROCESS OF TREATING CRUDE RESINS AND THEIR RESIDUES.

No. 495,543. Patented Apr. 18, 1893.

Witnesses:

Inventor:
Gabriel Col
by Briesen & Knauth
his Attorneys.

United States Patent Office.

GABRIEL COL, OF CASTEL-JALOUX, FRANCE.

PROCESS OF TREATING CRUDE RESINS AND THEIR RESIDUES.

SPECIFICATION forming part of Letters Patent No. 495,543, dated April 18, 1893.

Application filed February 10, 1890. Serial No. 339,796. (No model.) Patented in France May 13, 1889, No. 198,161.

*To all whom it may concern:*

Be it known that I, GABRIEL COL, of the city of Castel-Jaloux, (Lot-et-Garonne,) France, have invented a Process for Treating Crude Resins and their Residues, (for which I have obtained Letters Patent in France for fifteen years, dated May 13, 1889, No. 198,161,) of which the following is a full, clear, and exact description.

This invention relates to an improved process for the preparation and distillation of crude resins and the desiccation of the resin and pitch forming the residuum of these operations; wherein steam alone is employed in all the operations, to the exclusion of any other heating agent; and I have shown in the accompanying drawings the apparatus employed in carrying out the aforesaid process, wherein, Figure 1 is a longitudinal section of the heating and stirring apparatus on the line 1—2 of Fig. 6. Fig. 2 is an elevation of the heating and stirring apparatus from the charging end. Fig. 3 is an end elevation of the same from the discharge end the tanks $m, m'$ being shown in vertical section. Fig. 4 is a longitudinal section of the distilling apparatus on the line 3—4 of Fig. 6. Fig. 5 is a central longitudinal section of the drying cylinder, and Fig. 6 is a top plan view of the apparatus.

My improved process in connection with the apparatus shown in the drawings is as follows: The crude turpentine or resinous matter is introduced into the cylinder $a$ through the hopper $b$ and open valve $c$. Steam is then admitted into the steam jacket and the stirrers brought into motion at a slow speed in the commencement of the operation. When the temperature of the mass in the cylinder has been raised to about 96° centigrade, the volatile matter separated by the heat from the crude material in the cylinder rises to the top and passes into the pipe $i$ from whence it is carried to the worm $j$ in condenser $j'$ and when properly condensed passes into the receptacle $k$, at the desired temperature, as indicated by the thermometer $f$, the steam is shut off from the jacket of the cylinder and the motion of the stirrers stopped. At the same time steam is let into the settling tanks $m, m'$ by the pipes $n, n$, as shown in Fig. 3, (the connection with the pipes $o, o$ having been previously closed) for the purpose of driving out any air remaining therein through the liquid sealing of the covers. The heated mass in the cylinder $a$ is then drawn off by the pipes $l, l^2$, into either of the settling tanks, and the connection with the pipes $o, o$, opened. Any vapor or volatile matter that may arise from the heated mass will then pass through the pipes $o, o$, into the pipe $i$ and thence into the condensing worm $j$. The mass in the settling tanks is then allowed to remain a sufficient length of time to allow the impurities to settle. The connection between the pipes $o$ and settling tanks being then closed, and the pipes disconnected from the covers, and the covers removed from the tanks, the supernatant liquor is then carefully decanted into any convenient receptacle ready for the distillating apparatus. The heavier liquid matters remaining in the settling tanks are also poured into any convenient receptacle to be distilled in a similar manner. The proper quantity of matter to be distilled is placed in the charger 1 from whence it passes into the receiver. The stop cock 8 is then closed and the charger can then be again filled, ready to be passed into the receiver as soon as the material therein has been distilled and the residuum drawn off. Before or at the time the material is delivered into the receiver, steam is let into the steam jackets, and after the receiver is fully charged, steam is also admitted into the coil in the receiver and also into the receiver itself through the pipe 9. The volatile matter and vapors in the form of spirits of turpentine will then pass through pipe 4 to the condenser and then be collected in any convenient vessel. While the distillation is going on the material in the receiver should be slowly heated until it reaches a temperature of from about 150° to 155° centigrade or until extraction by distillation has ceased. All steam should then be shut off and any remaining volatile matter will be collected in the condenser, but when the steam is shut off from the body of the receiver the air valve 10 should be opened to prevent a vacuum in the receiver. When the distillation is finished the valve $y$ is opened and the residuum is drawn off preferably into a filter shown at A Fig. 6 mounted for convenience on a sliding carriage. This residuum can be again distilled if desired in either of the apparatus above described.

When crude material direct from the trees is to be treated, I prefer to use the device shown in Fig. 5 as such material always retains a little moisture and unless dried readily opalizes. This device is similar to that of the cylinder $a$ shown in Fig. 1 except that the material when properly desiccated is withdrawn directly from the cylinder 12 through the opening 17 and transferred in any desired manner to the distilling apparatus, where it is treated in the manner before described.

In my improved process steam alone is employed as the heating medium to the exclusion of any other heating agent.

Having thus described my invention, what I claim is—

The herein described process of treating crude turpentine, which consists in first stirring the heated crude products, then running off the same into settling tanks, there allowing the mixture to settle, then decanting the upper liquid portion and distilling it, until the volatile matters have passed into a condenser, substantially as described.

The foregoing specification of my improved processes of and apparatus for the preparation and distillation of crude resins and for the desiccation of colophony and pitch forming the residues of these operations signed by me this 16th day of December, 1889.

GABRIEL COL.

Witnesses:
CHARLES PETIT DE MEURVILLE,
HORACE G. KNOWLES.